United States Patent
Urano et al.

(10) Patent No.: US 10,823,686 B2
(45) Date of Patent: Nov. 3, 2020

(54) X-RAY INSPECTION METHOD AND X-RAY INSPECTION DEVICE

(71) Applicant: HITACHI HIGH-TECH SCIENCE CORPORATION, Minato-ku, Tokyo (JP)

(72) Inventors: Yuta Urano, Tokyo (JP); Kaifeng Zhang, Tokyo (JP); Yoshiki Matoba, Tokyo (JP); Akihiro Takeda, Tokyo (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 279 days.

(21) Appl. No.: 15/744,223

(22) PCT Filed: May 13, 2016

(86) PCT No.: PCT/JP2016/064223
§ 371 (c)(1),
(2) Date: Jan. 12, 2018

(87) PCT Pub. No.: WO2017/043123
PCT Pub. Date: Mar. 16, 2017

(65) Prior Publication Data
US 2018/0202947 A1    Jul. 19, 2018

(30) Foreign Application Priority Data
Sep. 10, 2015 (JP) .................. 2015-178954

(51) Int. Cl.
*G01N 23/10* (2018.01)
*G01N 23/18* (2018.01)
(Continued)

(52) U.S. Cl.
CPC ............. *G01N 23/10* (2013.01); *G01N 23/04* (2013.01); *G01N 23/083* (2013.01); *G01N 23/16* (2013.01); *G01N 23/18* (2013.01); *G01N 2223/60* (2013.01)

(58) Field of Classification Search
CPC ......... G01N 23/04; G01N 23/18; G01N 23/10
See application file for complete search history.

(56) References Cited

U.S. PATENT DOCUMENTS 4,600,998 A * 7/1986 Huet .................... A61B 6/0457
378/15
4,975,934 A * 12/1990 Sauerwein ........... G01N 23/043
378/19
(Continued)

FOREIGN PATENT DOCUMENTS

EP       0604302 A1    6/1994
JP       58-80556 A    5/1983
(Continued)

OTHER PUBLICATIONS

JP2010/104107, JP,2011-242374A, JP2004-184357 english translations.*
(Continued)

*Primary Examiner* — David P Porta
*Assistant Examiner* — Djura Malevic
(74) *Attorney, Agent, or Firm* — Miles & Stockbridge, P.C.

(57) ABSTRACT

Detection can be performed even for a thick inspection target object through time delay integration without degradation of spatial resolution. There is provided an X-ray inspection device configured to include: an X-ray source that generates X-rays; a transport unit that performs transporting a sample; a detecting unit that has a time delay integration type detector which detects X-rays generated by the X-ray source and transmitted through the sample transported by (Continued)

the transport unit; and a defect determining unit that processes a signal obtained by detecting the X-rays transmitted through the sample by the time delay integration type detector of the detecting unit and determines a defect in the sample. The transport unit performs transporting the sample while causing the sample to rotate in synchronization with the transporting when the sample passes in front of the time delay integration type detector of the detecting unit.

16 Claims, 14 Drawing Sheets

(51) Int. Cl.
    *G01N 23/083* (2018.01)
    *G01N 23/16* (2018.01)
    *G01N 23/04* (2018.01)

(56) References Cited

U.S. PATENT DOCUMENTS

| | | | |
|---|---|---|---|
| 4,989,225 A | 1/1991 | Gupta et al. | |
| 5,845,002 A * | 12/1998 | Heck | B07C 5/3416 382/110 |
| 6,381,299 B1 * | 4/2002 | Baba | A61B 6/032 378/17 |
| 6,529,270 B1 * | 3/2003 | Bills | G01N 21/9501 356/237.2 |
| 7,110,489 B2 * | 9/2006 | Roy | G01N 23/046 378/20 |
| 7,310,404 B2 * | 12/2007 | Tashiro | A61B 6/032 378/10 |
| 7,508,908 B2 * | 3/2009 | Hu | G01N 9/24 378/54 |
| 7,751,526 B2 * | 7/2010 | Pasini | A61B 6/032 378/101 |
| 8,300,762 B2 * | 10/2012 | Suzuki | A61B 6/032 378/15 |
| 9,161,726 B2 * | 10/2015 | Dong | A61B 6/035 |
| 2002/0174989 A1 * | 11/2002 | Katayama | B24B 3/245 166/358 |
| 2007/0179662 A1 * | 8/2007 | Erlingsson | G01N 23/12 700/200 |
| 2009/0080706 A1 * | 3/2009 | Tao | G01N 21/94 382/110 |
| 2019/0003989 A1 * | 1/2019 | Miyazaki | G01N 23/04 |

FOREIGN PATENT DOCUMENTS

| | | |
|---|---|---|
| JP | 09-196865 A | 7/1997 |
| JP | 2004-184357 A | 7/2004 |
| JP | 2011-242374 A | 12/2011 |
| WO | WO 2010/104107 A1 | 9/2010 |

OTHER PUBLICATIONS

Extended European Search Report dated Apr. 26, 2019 in counterpart European Application 16 843 989.1.

* cited by examiner

[Fig. 1]
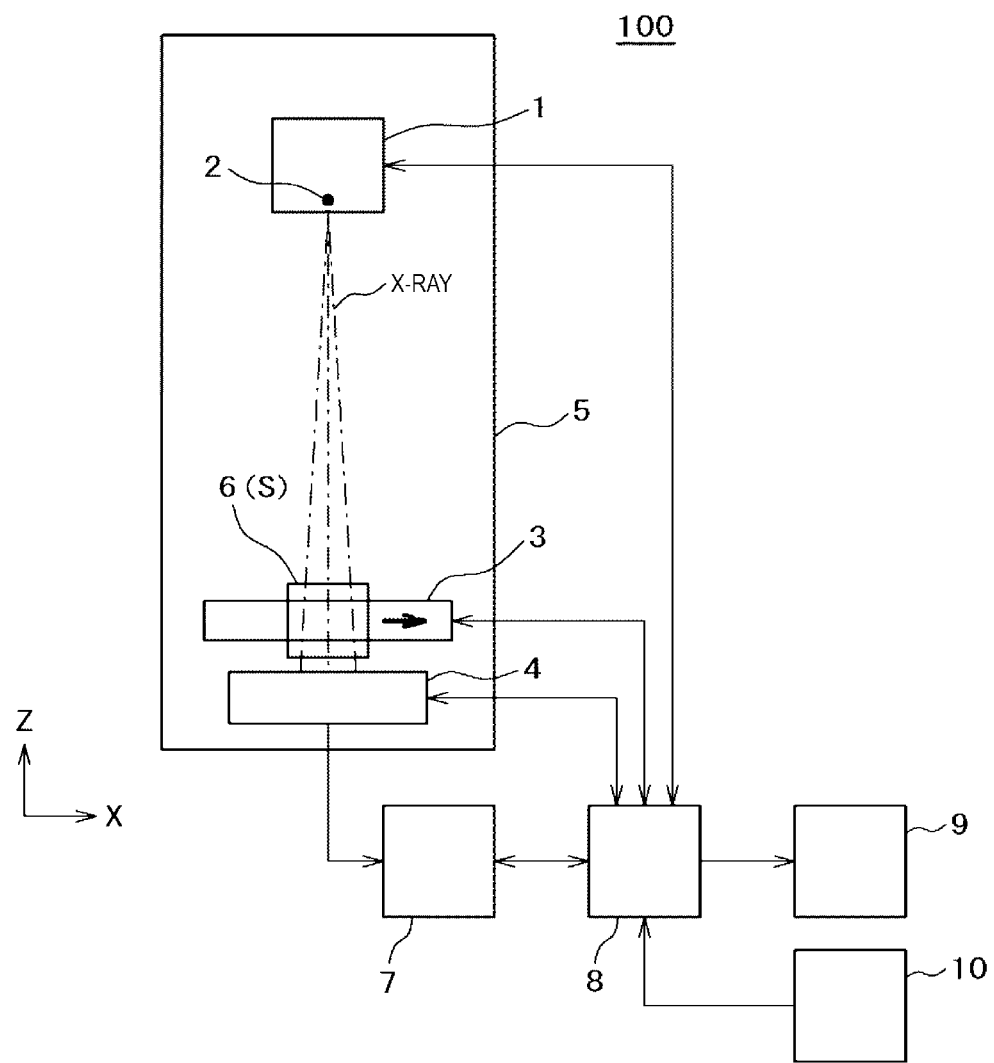

[Fig. 2A]
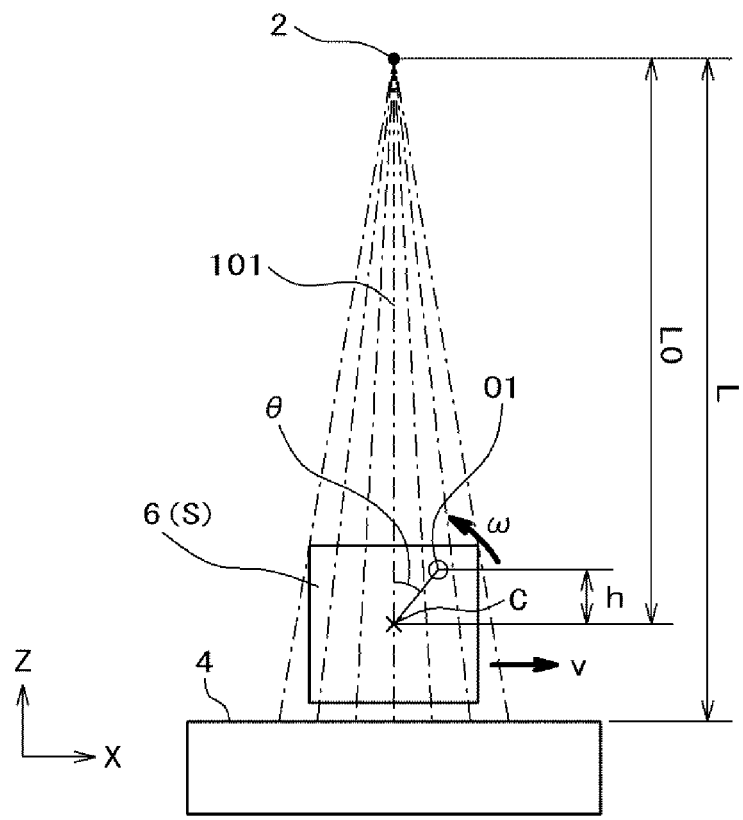
[Fig. 2B]
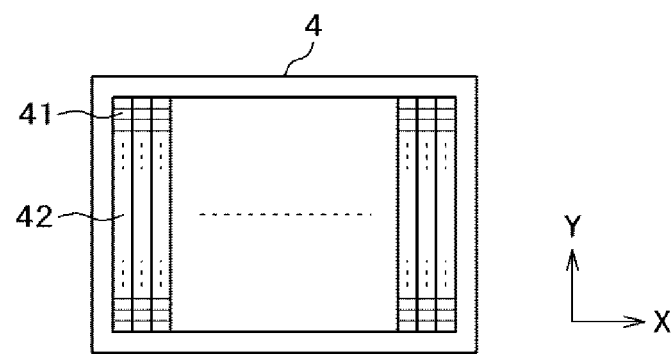

[Fig. 3A]
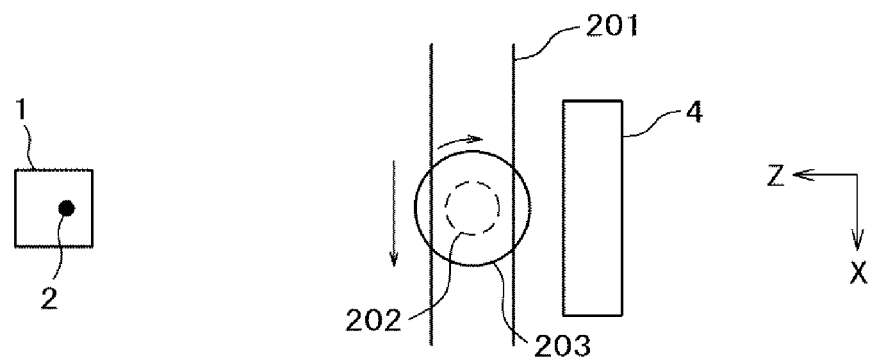
[Fig. 3B]
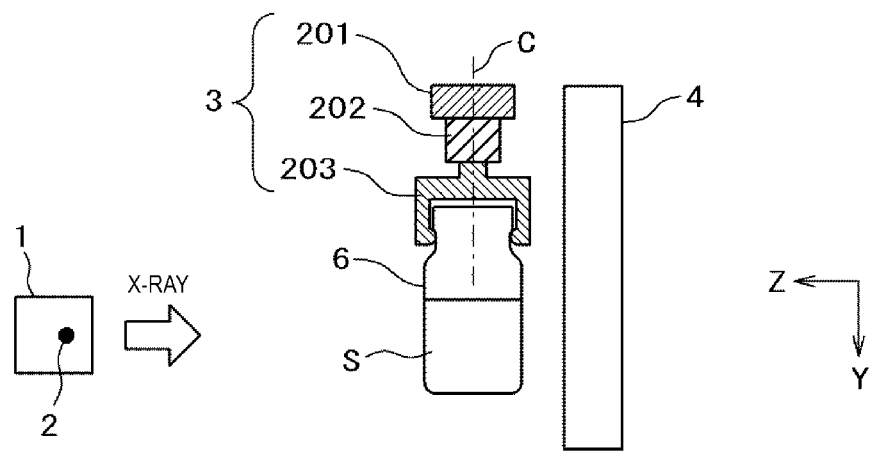
[Fig. 4A]
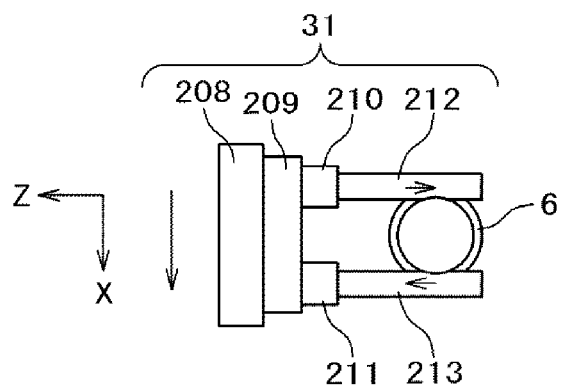

[Fig. 4B]
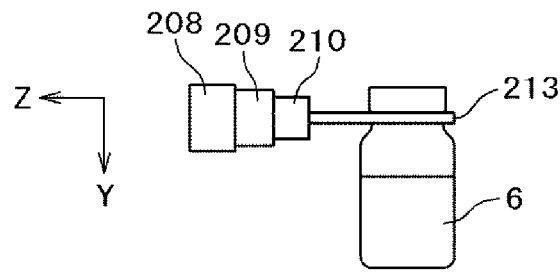
[Fig. 4C]
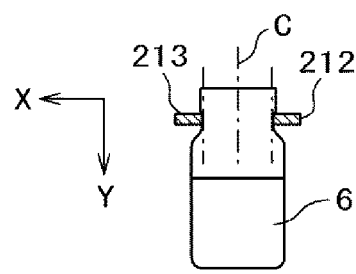
[Fig. 5A]
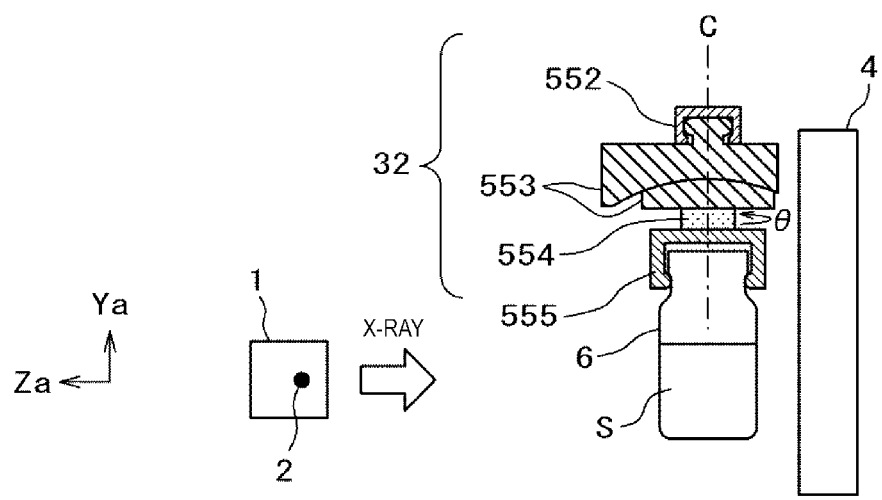

[Fig. 5B]
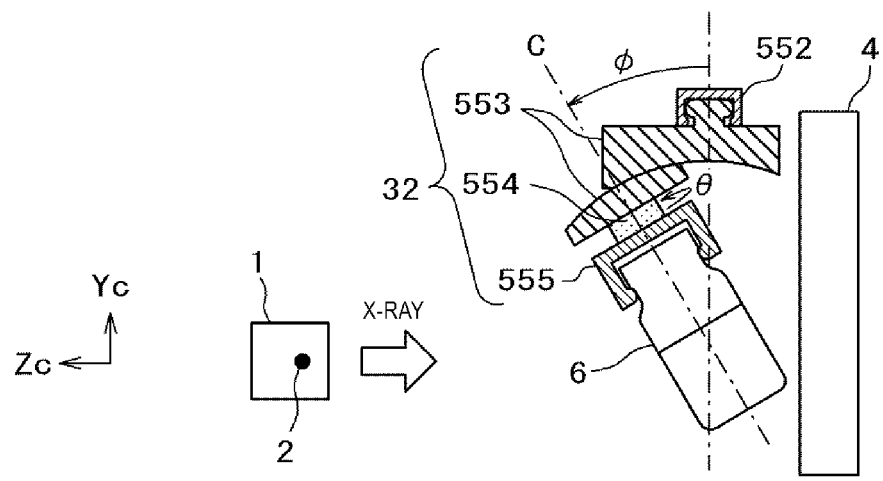
[Fig. 6A]
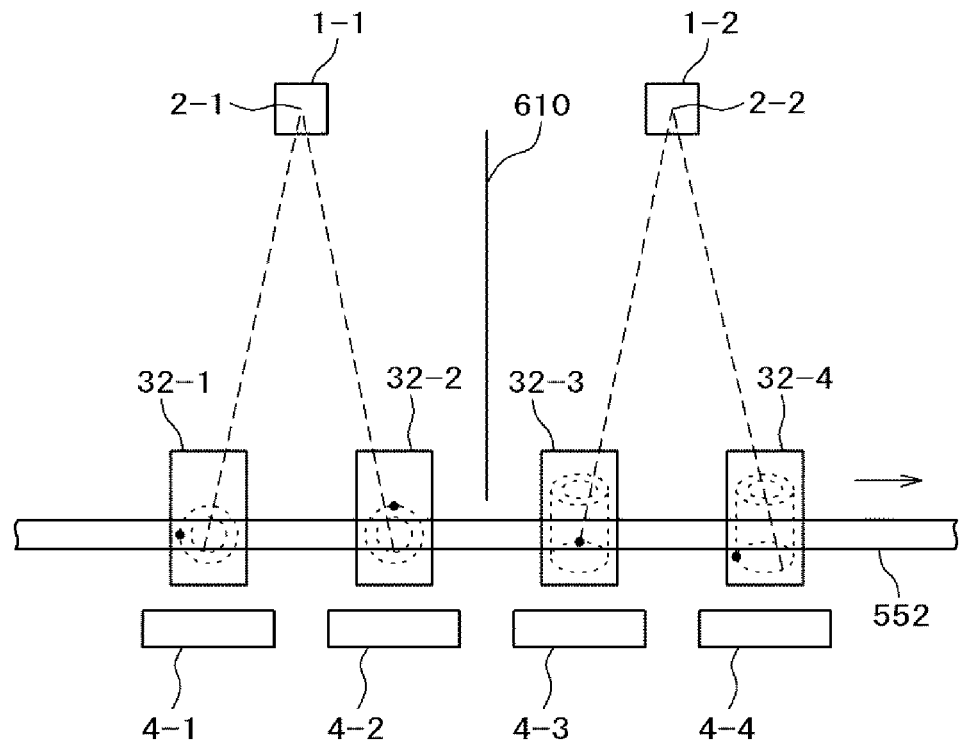

[Fig. 6B]
|  | CONDITION A | CONDITION B | CONDITION C | CONDITION D |
|---|---|---|---|---|
| TDI SENSOR | 4-1 | 4-2 | 4-3 | 4-4 |
| SAMPLE AZIMUTH ANGLE $\theta$ (DEGREE) | 0 | 90 | 90 | 0 |
| SAMPLE INCLINATION ANGLE $\phi$ (DEGREE) | 0 | 0 | 45 | 45 |
[Fig. 7]
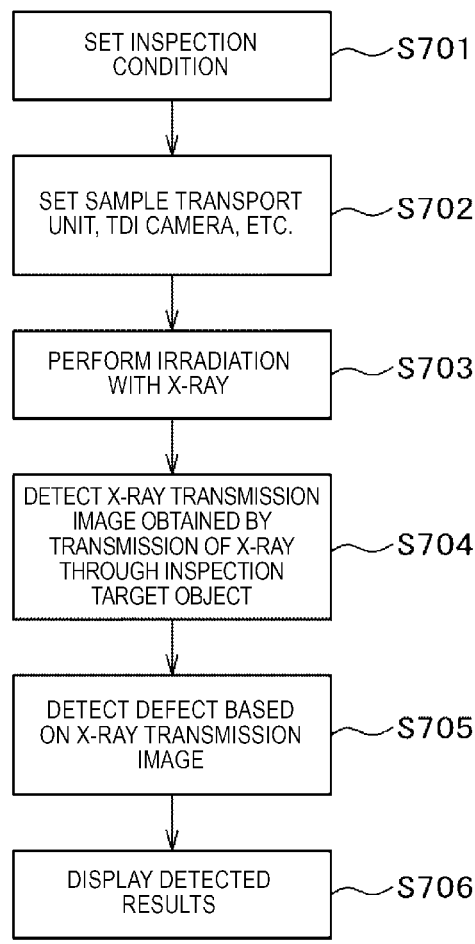

[Fig. 8]
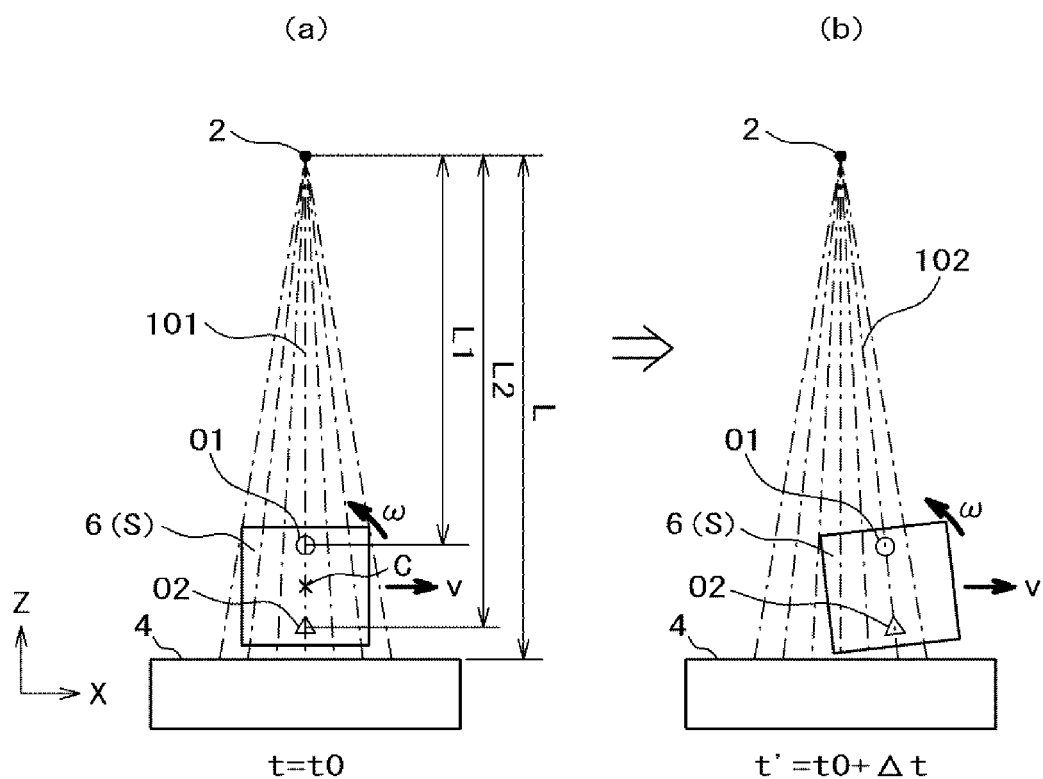

[Fig. 9]
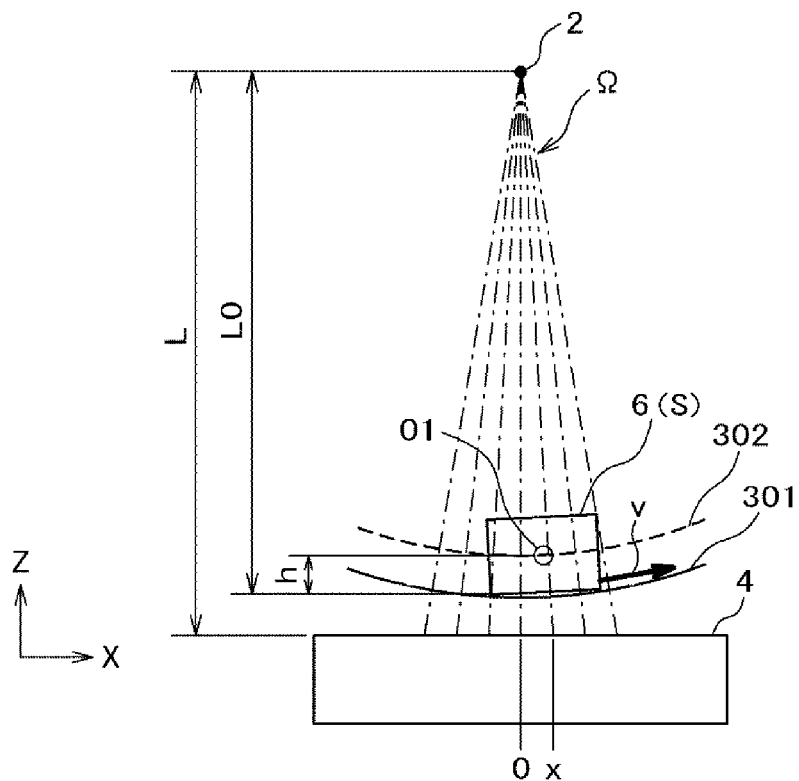
[Fig. 10A]
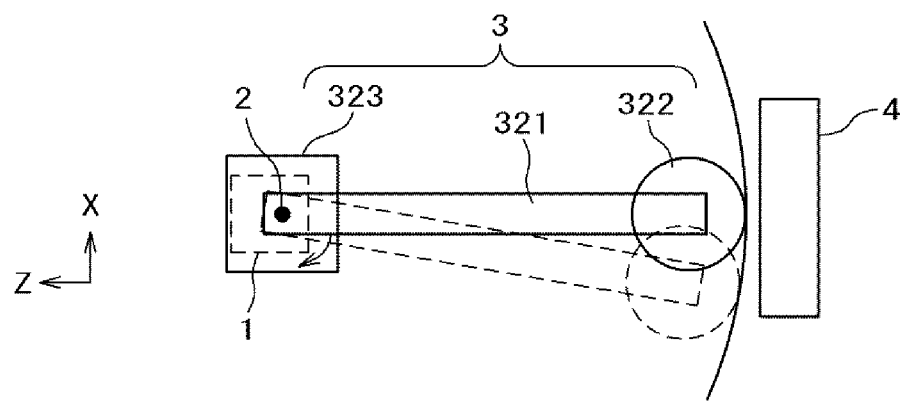

[Fig. 10B]
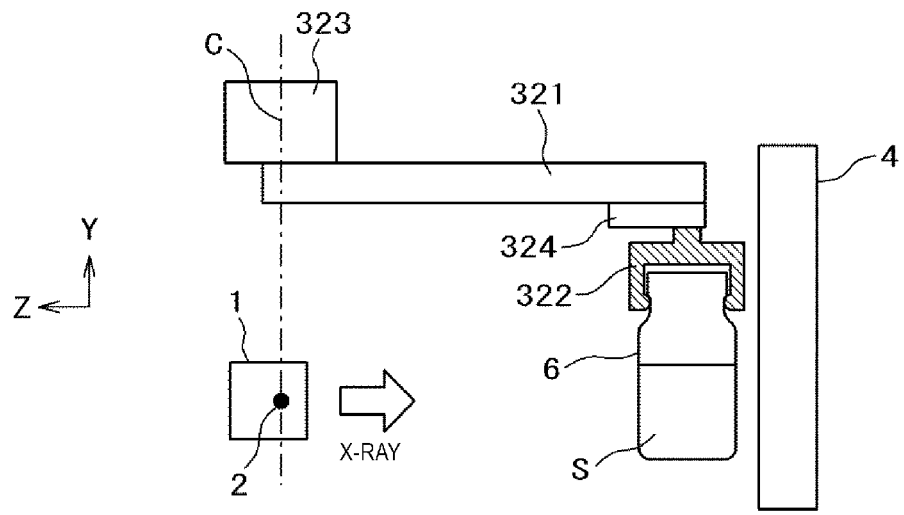
[Fig. 11]
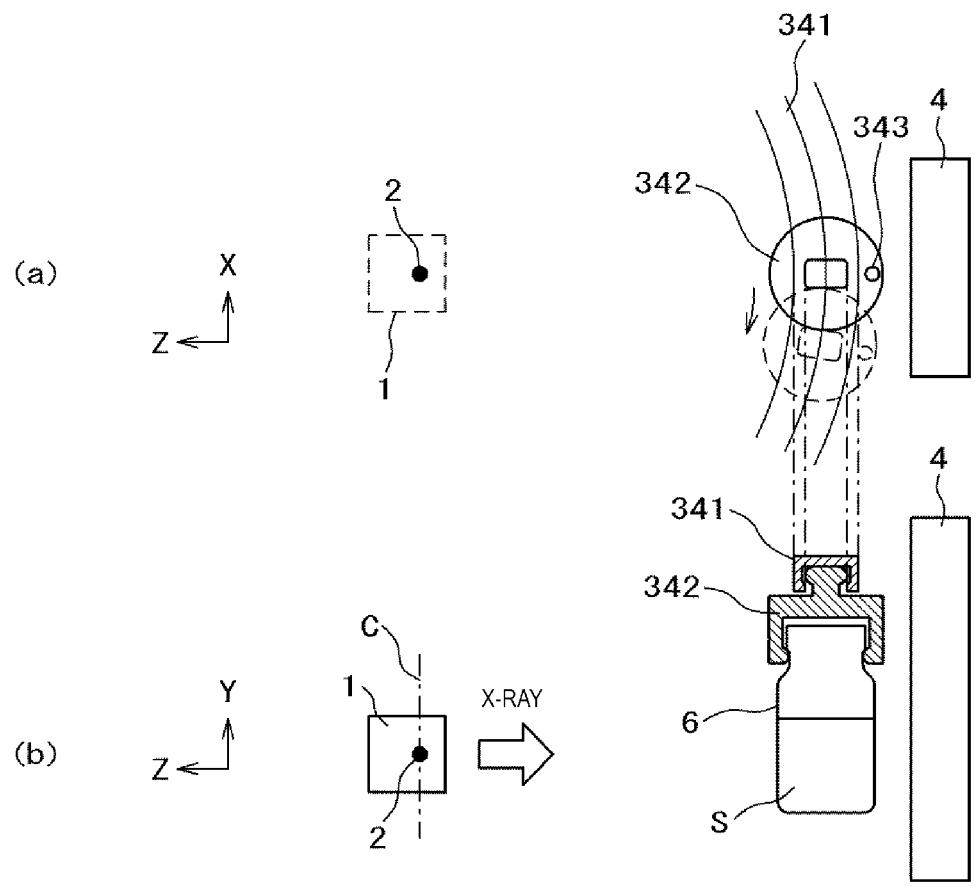

[Fig. 12A]
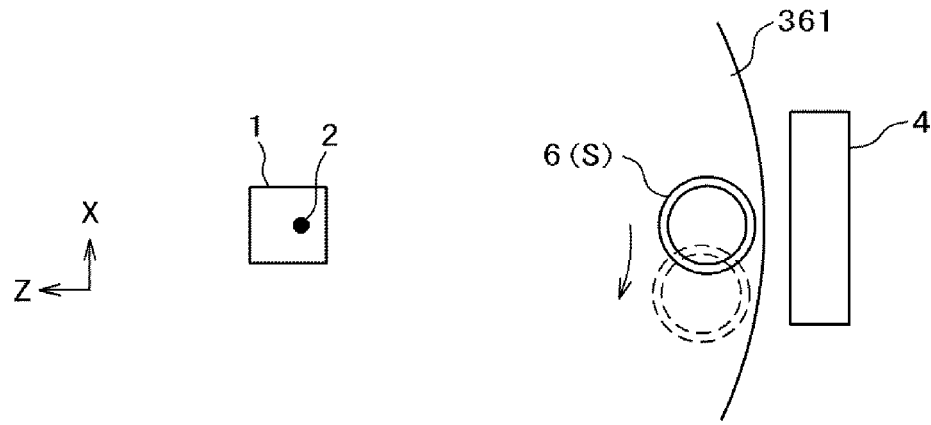
[Fig. 12B]
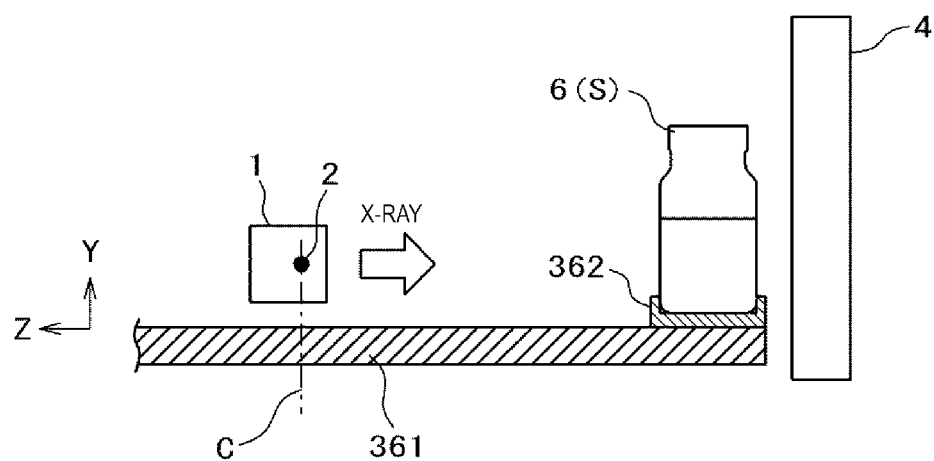
[Fig. 13A]
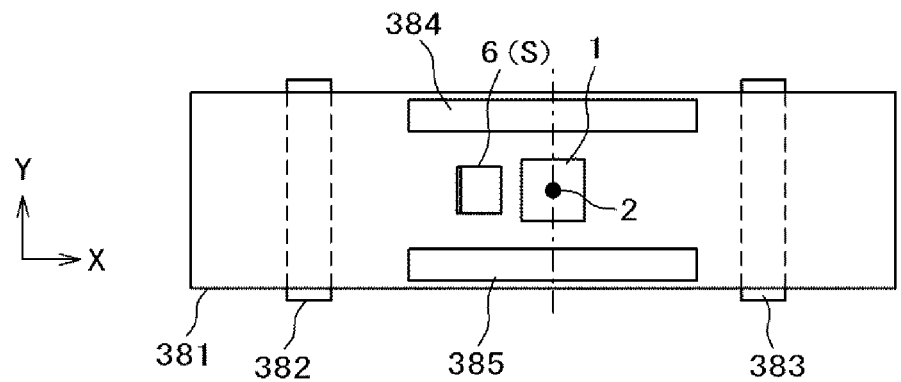

[Fig. 13B]
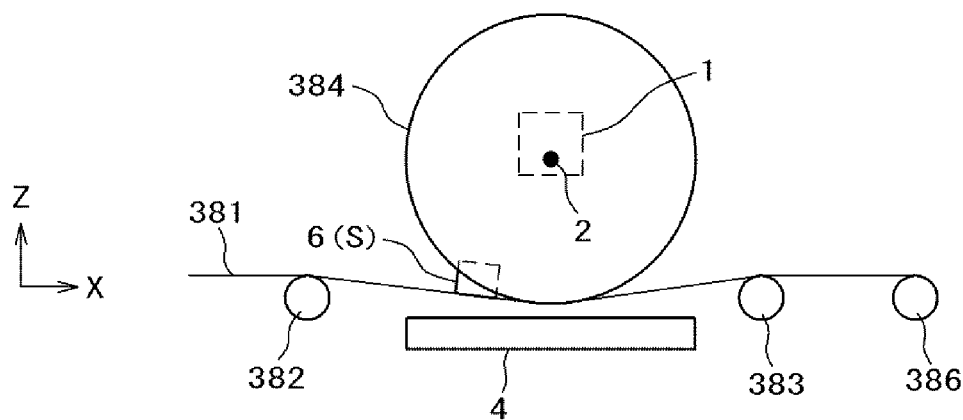
[Fig. 14A]
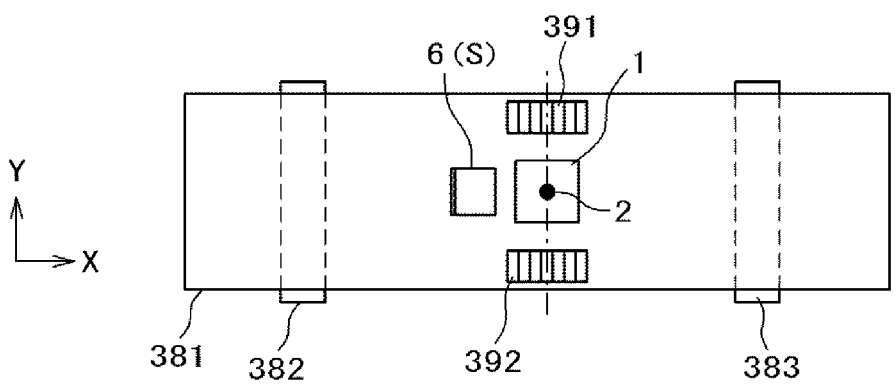
[Fig. 14B]
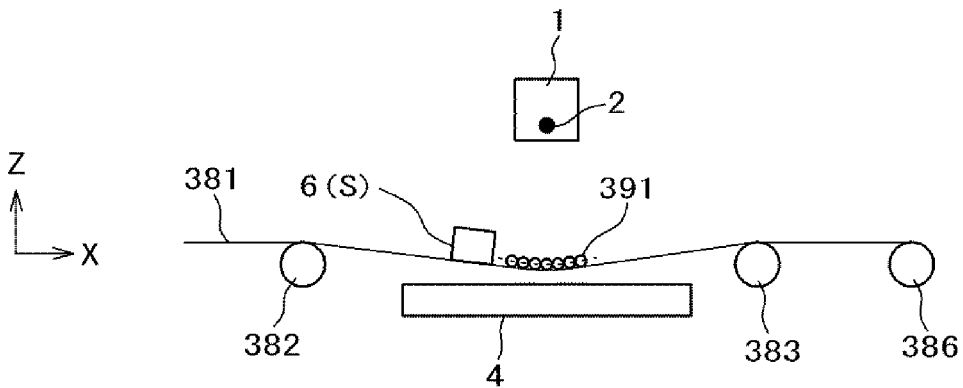

[Fig. 15]
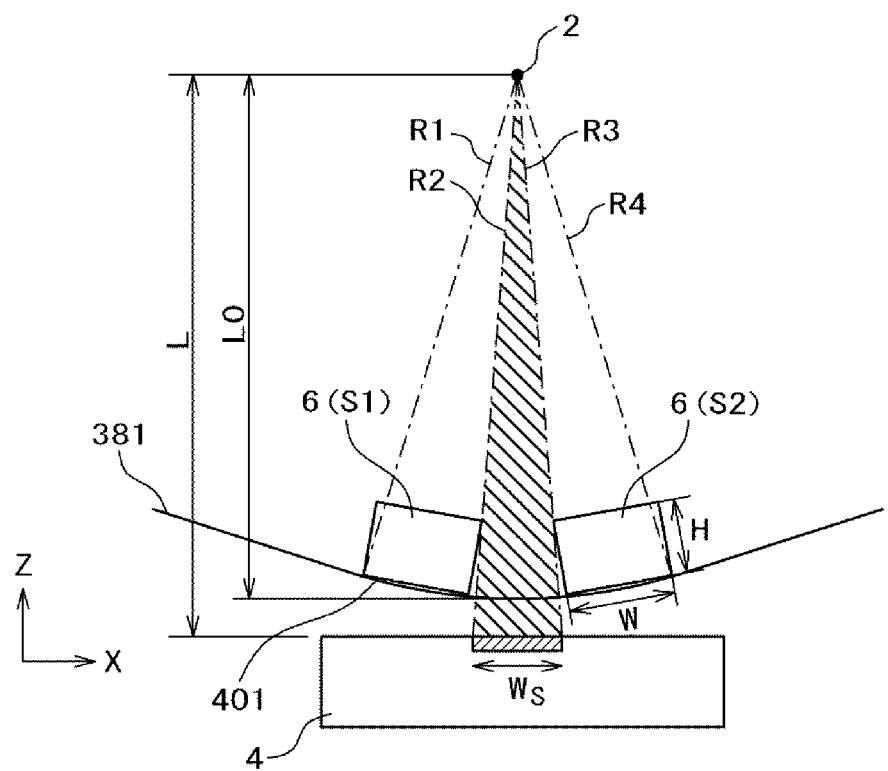

[Fig. 16A]
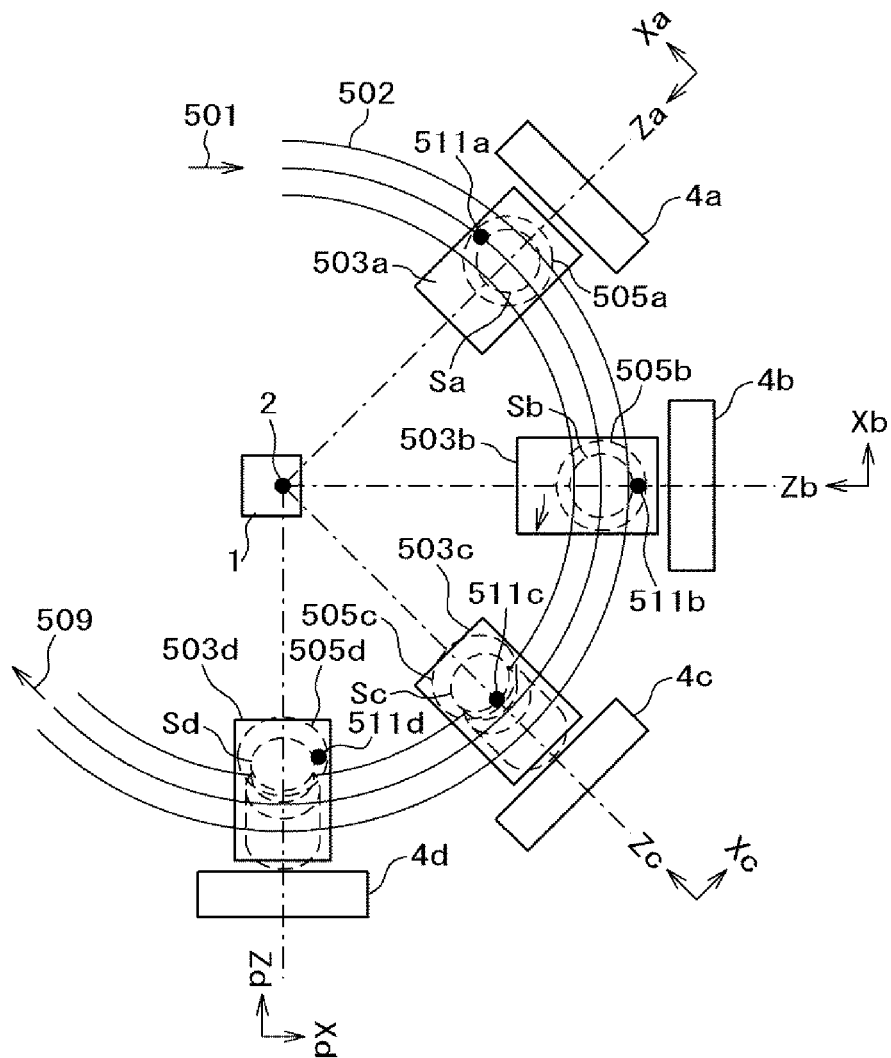
[Fig. 16B]
|  | CONDITION a | CONDITION b | CONDITION c | CONDITION d |
|---|---|---|---|---|
| TDI SENSOR | 4a | 4b | 4c | 4d |
| SAMPLE AZIMUTH ANGLE θ (DEGREE) | 0 | 90 | 90 | 0 |
| SAMPLE INCLINATION ANGLE φ (DEGREE) | 0 | 0 | 45 | 45 |

[Fig. 17]
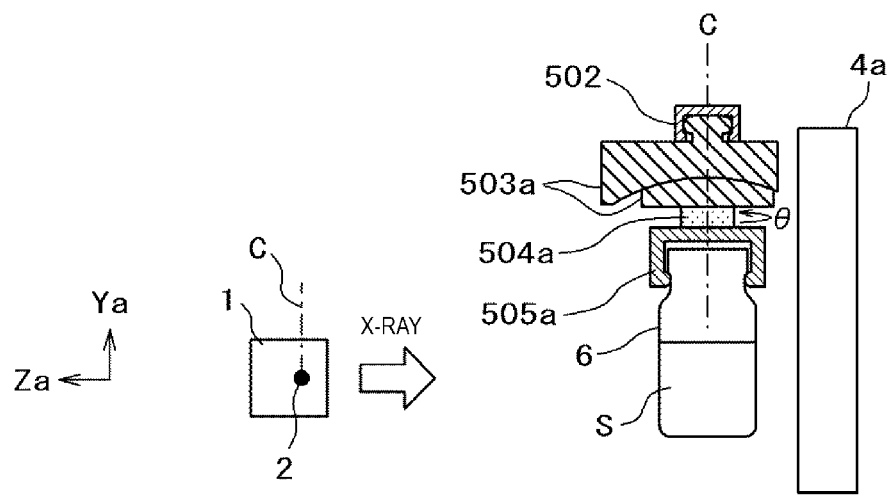
[Fig. 18]
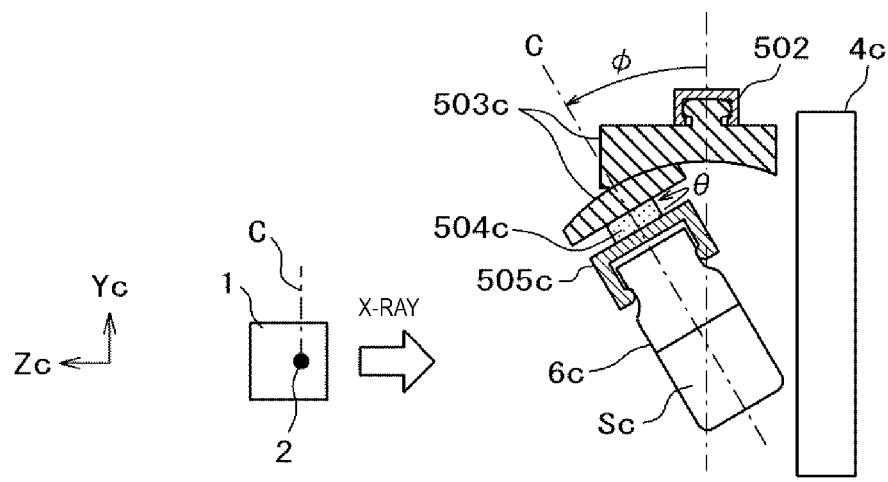

X-RAY INSPECTION METHOD AND X-RAY INSPECTION DEVICE

TECHNICAL FIELD

The present invention relates to an X-ray inspection method and an X-ray inspection device for irradiating a sample with X-rays and inspecting the sample based on an intensity distribution of X-rays transmitted through the sample.

BACKGROUND ART

JP-A-2011-242374 (PTL 1) discloses an X-ray inspection device that is capable of detecting foreign matter with high sensitivity even in a case of a low output of X-rays generated by an X-ray generating unit. This publication discloses that "the X-ray inspection device includes an X-ray detector 10, which synthesizes detection data obtained from each detecting element for each stage of a plurality of detecting element rows 101 to 108 through time delay integration and outputs synthetic data, and a determination unit 44, which determines presence or absence of foreign matter in an inspection target object W based on the synthetic data that is output by the X-ray detector 10, and further includes a stage setting unit 46 which sets, in response to the thickness information of the inspection target object W, the number of stages of the detecting element rows that are targets of the time delay integration performed by the X-ray detector 10".

CITATION LIST

Patent Literature

PTL 1: JP-A-2011-242374

SUMMARY OF INVENTION

Technical Problem

PTL 1 discloses the X-ray inspection device that is capable of detecting foreign matter with high sensitivity even in a case where a low output of X-rays is generated by the X-ray generating unit. However, in the X-ray inspection device disclosed in PTL 1, the number of stages of detecting element rows which are the target of the time delay integration is set to be small in a case where the inspection target object has a large thickness. Therefore, problems arise in that a detection output is low, compared to a case of a small thickness, and thus it is difficult to detect foreign matter with high sensitivity.

An object of the present invention is to provide an X-ray inspection method and an X-ray inspection device in which it is possible to perform detection even for a thick inspection target object through time delay integration without degradation of spatial resolution.

Solution to Problem

In order to solve the problems described above, in the present invention, an X-ray inspection device is configured to include: an X-ray source that generates X-rays; a transport unit that performs transporting a sample; a detecting unit that has a time delay integration type detector which detects X-rays generated by the X-ray source and transmitted through the sample transported by the transport unit; and a defect determining unit that processes a signal obtained by detecting the X-rays transmitted through the sample by the time delay integration type detector of the detecting unit and determines a defect in the sample. The transport unit performs transporting the sample while causing the sample to rotate in synchronization with the transporting when the sample passes in front of the time delay integration type detector of the detecting unit.

In addition, in order to solve the problems described above, in the present invention, there is provided an X-ray inspection method including: irradiating a sample to which transporting is performed by a transport unit with X-rays generated from an X-ray source; detecting X-rays transmitted through the sample irradiated with the X-rays, by a time delay integration type detector; and processing a signal obtained by detecting the X-rays transmitted through the sample by the time delay integration type detector and determining a defect in the sample. The sample is irradiated with the X-rays while the sample is caused to rotate in synchronization with the transporting when the sample passes in front of the time delay integration type detector of the detecting unit.

Advantageous Effects of Invention

According to the present invention, in the X-ray inspection method and the X-ray inspection device, it is possible to detect a fine defect even for a thick inspection target object with high sensitivity without degradation of spatial resolution in a case of using the time delay integration type detector.

Problems, configurations, and effects, in addition to those described above, are clearly described in the following description of embodiments.

BRIEF DESCRIPTION OF DRAWINGS

FIG. 1 is a diagram of a configuration of an X-ray inspection device according to a first example of the present invention.

FIG. 2A is a block diagram illustrating a relationship between a focal point of an X-ray source, a container, and a TDI camera in a sample transport device according to the first example of the present invention.

FIG. 2B is a plan view illustrating a configuration of the TDI camera used in the sample transport device according to the first example of the present invention.

FIG. 3A is a plan view of a sample transport unit according to the first example of the present invention.

FIG. 3B is a front view of the sample transport unit according to the first example of the present invention.

FIG. 4A is a plan view of another type of sample transport unit according to the first example of the present invention.

FIG. 4B is a side view of the other type of sample transport unit according to the first example of the present invention.

FIG. 4C is a front view of the other type of sample transport unit according to the first example of the present invention.

FIG. 5A is a front view of the sample transport unit in a state in which a container is transported while the container is caused to rotate in a vertical posture in still another type according to the first example of the present invention.

FIG. 5B is a front view of the sample transport unit in a state in which the container is transported while the container is caused to rotate in a state of inclination in still another type according to the first example of the present invention.

FIG. 6A is a plan view of a sample transport unit according to a modification example of the first example of the present invention.

FIG. 6B is a table of a list of combination conditions of sample azimuth angles and inclination angles of the sample transport unit according to the modification example of the first example of the present invention.

FIG. 7 is a flowchart illustrating flow of processes of an X-ray inspection method according to the first example of the present invention.

FIG. 8 is a block diagram illustrating a relationship between a focal point of an X-ray source, a container, and a TDI camera in a sample transporting method according to a second example of the present invention.

FIG. 9 is a front view of the sample transport unit according to the second example of the present invention.

FIG. 10A is a plan view of the sample transport unit according to the second example of the present invention.

FIG. 10B is a front view of the sample transport unit according to the second example of the present invention.

FIG. 11 illustrates another type of sample transport unit according to the second example of the present invention, (a) illustrates a plan view, and (b) illustrates a front view.

FIG. 12A is a plan view of still another type of sample transport unit according to the second example of the present invention.

FIG. 12B is a front view of the other type of sample transport unit according to the second example of the present invention.

FIG. 13A is a plan view of still another type of sample transport unit according to the second example of the present invention.

FIG. 13B is a front view of the other type of sample transport unit according to the second example of the present invention.

FIG. 14A is a plan view of still another type of sample transport unit according to the second example of the present invention.

FIG. 14B is a front view of the other type of sample transport unit according to the second example of the present invention.

FIG. 15 is a plan view schematically illustrating an X-ray optical system of the sample transport unit according to the second example of the present invention.

FIG. 16A is a plan view of the sample transport unit that performs imaging in a plurality of sample directions according to the second example of the present invention.

FIG. 16B is a table of a list of combination conditions of sample azimuth angles and inclination angles of the sample transport unit according to the second example of the present invention.

FIG. 17 is a front view of the sample transport unit in a state in which a container, in which a sample is contained, is transported while the container is caused to rotate in a vertical posture, by the sample transport unit that performs imaging in the plurality of sample directions according to the second example of the present invention.

FIG. 18 is a front view of the sample transport unit in a state in which a container, in which a sample is contained, is transported while the container is caused to rotate in an inclined posture, by the sample transport unit that performs imaging in the plurality of sample directions according to the second example of the present invention.

DESCRIPTION OF EMBODIMENTS

According to the present invention, an X-ray inspection device is configured to include: an X-ray source that generates X-rays from a focal point in a radial ray direction and irradiates a sample with the X-rays; a time delay integration (TDI) type detector that detects X-rays transmitted through the sample after radiating from the X-ray source; and a defect detecting unit that detects a defect based on an X-ray transmission image detected by an X-ray TDI detector. A relative direction of the sample is set to be substantially the same as the ray direction of the X-rays at any time point within a period of time of integral computation by the TDI type detector.

In the example, an example of the X-ray inspection device that irradiates a sample with X-rays and inspects the sample based on an intensity distribution of X-rays transmitted through the sample is described.

Example 1

FIG. 1 illustrates an example of a diagram of a configuration of an X-ray inspection device 100 of the example. The X-ray inspection device 100 includes an X-ray tube 1, a sample transport unit 3, a TDI camera 4, an X-ray shielding unit 5, a defect determining unit 7, a controller 8, a display unit 9, and an input unit 10.

The X-ray tube 1 irradiates a sample S with X-rays. The X-ray tube 1 internally includes a target (anode), and electrons accelerate and collide with the target such that the X-rays are generated. A region on the target with which the electrons collide, that is, a region in which X-rays are generated, is set as a focal point 2. The X-rays, with which the sample S is irradiated, are transmitted through the sample S and are detected as an X-ray transmission image by the TDI camera 4. By using the TDI camera 4 as a detector, the X-ray transmission image of the sample S which is continuously transported by the sample transport unit 3 is constantly acquired. In addition, it is possible to have elongated accumulation time by the number of stages of TDI, compared to a case of using a common X-ray line camera, and thus the X-ray intensity increases. In this manner, an image having a high S/N ratio is obtained, and thus the inspection sensitivity improves.

The TDI camera 4 has a configuration in which a fiber optic plate having a surface, on which a scintillator layer is formed, is linked with an image sensor. A time delay integration (TDI) type CCD sensor is used as the image sensor, and thereby it is possible to image the X-rays in a TDI method.

The X-ray shielding unit 5 shields the X-rays generated by the X-ray tube 1 and the reflected/scattered X-ray components and isolates a space in which irradiation with the X-rays is performed so as to prevent a human hand or the like from entering the space. In a case where the X-ray shielding unit 5 is not installed under a predetermined condition, an interlock is actuated and the irradiation with the X-rays by the X-ray source 1 is stopped. The configuration described above enables a device operator or the like to avoid the X-ray exposure and ensures safety of the X-ray inspection device 100.

The defect determining unit 7 discriminates a defect in a sample based on the X-ray transmission image detected by the TDI camera 4 and outputs the presence or absence, the number, a position, or a size of the defect. Here, in the inspection of a solution vial of medicine, a lyophilizer vial, a tablet, and food, an example of the defect includes foreign matter (metal, glass, resin, rubber, an insect, a hair, or the like) mixed therein. In addition, in the inspection of a high-performance material such as carbon fiber reinforced plastic (CFRP), ceramics, or a composite material, examples of the defect include a scratch, a crack, a void, and the like. In addition, in the inspection of a lithium-ion secondary battery or a fuel battery, examples of the defect include small metallic foreign matter mixed in the lithium-ion battery or a scratch or a void in a component member.

The X-ray transmission image is obtained by adding fixed pattern noise of the X-ray TDI camera 4, thermal·electric noise of an output circuit, shot noise that is randomly generated as statistical fluctuation depending on the number of X-ray photons, or the like, as noise to a background pattern obtained by the thickness or a material distribution of the sample. When a defect is present, characteristics of the contrast locally appear at a position of the defect. In a case where the defect is the foreign matter, the position thereof is locally dark with respect to the surroundings. In a case where the defect is the crack or the void, the position thereof is locally bright with respect to the surroundings. In the defect determining unit 7, after filtering processing, differential processing, or the like is performed to attenuate the background pattern or the noise on the detected image, a threshold value is set such that remaining background pattern or noise is not substantially detected, and position having a value that exceeds the threshold value is determined as the defect. In this manner, the defect is detected.

In the defect determining unit 7, the center of a spatial spread of the bright or dark pattern of the position determined as the defect (a position having the maximum brightness difference against the background or a position of the center of gravity of the brightness difference) is measured as a defective position. Further, a size of the defect is measured from the brightness difference of a defective portion against the background and the spatial spread of brightness. In order to check the defect determining results described above after the inspection, a defect image including the defective portion and the surrounding background, and information of the defective position, and information associated with the defect (a size and a type of the defect) are stored in a memory that is internally installed in the defect determining unit 7 or the controller 8.

The controller 8 receives a signal from the input unit 10 or the component members described above, controls the X-ray source 1 or the X-ray TDI camera 4, sets and controls a parameter of the defect determining unit 7. Parameter setting values of the component members described above, a state, an inspection condition, and a defect determining result (the number of defects, a position thereof, a size of a defect, or a defect image) are displayed on the display unit 9.

The input unit 10 receives an input from outside such as an input by a user, and the input is transmitted to the controller 8. Examples of input values input from the input unit 10 include setting parameters of configuration requirements, a setting value of the inspection condition, information related to the sample, and the like.

A case where the sample S is put in a container 6 and is transported is described below; however, the present invention is not limited thereto. In a case where the sample S is a solid, it is not absolutely necessary to put the sample in the container 6 to perform the transporting, and the sample transport unit 3 may directly hold and transport the sample S.

The sample S as an inspection target is contained in the container 6, and the container 6 is held or is mounted to be transported by the sample transport unit 3. A line rate of the TDI camera 4 is set along with the X-ray tube 1 and a transport speed of the sample by the sample transport unit 3, and the imaging is performed in synchronization with the transport speed of the sample. The sample transport unit 3 outputs, to the controller 8, information such as the transport speed or a transport distance which is required for timing synchronization of the TDI camera 4.

For example, in a case where the X-ray inspection device 100 is installed in an environment in which a sample is transported at a substantially constant speed in advance in a manufacturing process or the like of the sample, the X-ray inspection device itself may not need to include the sample transport unit 3 and may operate in a configuration in which a transport system, which is installed in advance in the manufacturing process or the like of the sample, serves as the sample transport unit, and the TDI camera 4 is set in synchronization with the transport system. In this case, as necessary, an output of the transport system in the manufacturing process or the like of the sample, a position measurement value, an angle measurement value, which are obtained by measuring the sample that is transported or the transport system by an encoder, a speed measurement value obtained by measuring a speed by a speedometer, an angular velocity measurement value are input to the controller 8 and are used as information used for the synchronization.

FIG. 2A illustrates a principle of a method of rotating the container 6 in which the sample S is contained in the example. The principle of the method of rotating the container 6 in which the sample S is contained in the example is described as follows with reference to FIG. 2A in terms of an X-directional movement speed of the container 6 in which the sample S is contained. C represents a rotation center position of the rotation of the container 6 in which the sample S is contained when the sample transport unit 3 causes the container to rotate, and L0 represents a distance from the focal point to the rotation center. A position of an object in the sample S contained in the container 6 is represented by a polar coordinate $(r, \theta)$ with the rotation center as a reference.

The X-directional movement speed that is applied to the object at the position $(r, \theta)$ at an angular velocity $\omega$ is obtained in $-r\omega \cos \theta = -\omega h$. h represents a distance from the rotation center to the object in a thickness direction of the sample S contained in the container 6. A magnification of an image is obtained in $L/(L0-h)$, and thus the movement speed of an image of the object is obtained in $L(v-\omega h)/(L0-h)$. The value becomes $(L/L0)v$ when $\omega = v/L0$, and the value is constant regardless of a position h of the sample S contained in the container 6 in the thickness direction.

In other words, the angular velocity $\omega$ of the rotation of the container 6, in which the sample S is contained, is set to a value $(\omega = v/L0)$ of a ratio of a linear movement speed v in a TDI computation direction to the distance L0 from the focal point 2 to the rotation center of the container 6 in which the sample S is contained. In this manner, a difference in the movement speeds of images is offset at positions in the sample S contained in the container 6 in the thickness direction, and thus it is possible to image the entire sample S contained in the container 6 in the thickness direction without generating blur by the TDI computation.

When an example of a specific transport condition is described, the speed of the rotation of the container 6, in which the sample S is contained, is set to $\omega = 0.333$ rad/s = 0.0531 rps = 3.18 rpm when v = 100 mm/s and L0 = 300 mm. Here, the thickness direction of the sample S contained in the container 6 is a Z-direction in FIG. 3 and is a direction in which the focal point 2 is connected to the center of the light receiving region of the TDI sensor 4.

FIG. 2B illustrates a plan view of the TDI sensor 4. The TDI sensor 4 is formed to have a plurality of one-dimensional pixel rows 42 formed to be arranged in an X direction which are formed to have a plurality of pixels 41 aligned in a Y direction. When the container 6 moves in the X direction and an image of X-rays transmitted through a certain position of the sample S inside the container 6 sequentially moves through the one-dimensional pixel row 42 in the X direction, the TDI sensor 4 transmits and sequentially adds detection signals of the pixels 41 at the same positions of the pixel rows 42 in the Y direction in synchronization with the movement of the container 6 in the X direction. In this manner, it is possible to detect a weak image signal from the sample S.

An object in the sample S contained in the container 6 is also displaced in a Z direction (thickness direction of the sample) due to the rotation of the container 6, in which the sample S is contained. However, when a width of the TDI computation of the TDI sensor 4 is smaller than the distance from the focal point 2 to the sample S contained in the container 6, there is a small influence on the inspection result. Specifically, in a case where L0=300 mm, an XZ cross section of the sample S contained in the container 6 has a diameter of smaller than 20 mm, the width of the TDI computation of the TDI sensor 4 is 6.14 mm (=48 μm×128 stages), and a magnification at the rotation center (L/L0) is 1.1, a rotation angle of the container 6 in which the sample S is contained is 1.07 within a range of the TDI computation, and the maximum displacement in the Z direction due to the rotation angle is 3.72 mm. In this manner, the magnification of an image changes by up to about 1.2% during the TDI computation; however, the center position of a defect is not shifted, and thus there is no influence on discrimination between the presence and absence of the defect.

Such a configuration makes the sample have substantially the same relative direction with respect to the ray direction of the X-ray at any time point within the period of time of the integral computation by the TDI type detector and makes it possible to discriminate between the presence and absence of the defect without a shift of the center position of the defect.

As illustrated in a plan view in FIG. 3A and a front view in FIG. 3B, the sample transport unit 3 includes a linear motion mechanism 201, a rotating mechanism 202, and a sample holding portion 203. The sample holding portion 203 holds the sample S, and the rotating mechanism 202 causes the sample holding portion 203 to rotate around a certain fixed rotation center C as a rotation axis. The linear motion mechanism 201 causes the rotating mechanism 202 to linearly move in parallel with an integral computation direction of the TDI sensor 4.

FIGS. 3A and 3B illustrate an example of a medical vial with a lyophilizer sealed in a cylindrical bottle as an example of the container 6 in which the sample S is contained; however, the container 6, in which the sample S is contained, is not limited thereto, and it is possible to use, as a target, a container that can be fixed to be held by the sample holding portion 203.

A shape of the container 6, in which the sample S is contained, has a circular XZ cross section in FIG. 3A; however, the shape is not limited thereto, and it is possible to use, as a target, an arbitrary shape as long as the container is held and is caused to rotate. The rotating mechanism 202 uses a relative error of a rotation speed which is equal to or less than a reciprocal of the number of stages of integral computation of the TDI sensor 4 (for example, equal to or less than the relative error of the rotation speed of 0.78% in a case of 128 stages), and thereby it is possible to sufficiently reduce a rotation error during the TDI computation. While the sample S passes through a detection region between the X-ray tube 1 and a detecting system by the TDI sensor 4, the linear movement speed obtained by the linear motion mechanism 201 and the rotation speed obtained by the rotating mechanism 202 are constant, and a relationship between v and ω illustrated in FIG. 2 is satisfied.

FIGS. 4A, 4B, and 4C illustrate a plan view, a side view, and a front view of another embodiment of the sample transport unit 3, respectively.

A sample transport unit 31 illustrated in FIGS. 4A to 4C includes a sample fork interval adjusting mechanism 209, sample fork linear-motion mechanisms 210 and 211, sample forks 212 and 213, and a linear motion mechanism 208 that causes all of the components to linearly move. The container 6, in which the sample S is contained, is held by being pinched between the sample forks 212 and 213 that are positioned by the sample fork interval adjusting mechanism 209 and the sample fork linear-motion mechanisms 210 and 211.

The sample forks 212 and 213 move at a constant speed in opposite directions to each other by the sample fork linear-motion mechanisms 210 and 211 along a perpendicular axis (Z direction) to a direction (X direction) in which the container 6, in which the sample S is contained, is pinched. The movement causes the container 6, in which the sample S is contained, to rotate. The linear motion mechanism 208 is caused to linearly move along with the operation, and thereby the rotation and the linear movement of the container 6, in which the sample S is contained, are performed. The rotation speed of the container 6, in which the sample S is contained, is determined by an interval between the sample forks 212 and 213 and the movement speed thereof. The interval between the sample forks 212 and 213 is adjusted by the sample fork interval adjusting mechanism 209.

The other embodiment of the sample transport unit 3 is effectively applied to a case where, in order to obtain a constant position of the rotation axis with respect to the sample, the container 6, in which the sample S is contained, has a cylindrical portion that is pinched by the sample forks 212 and 213. The sample fork interval adjusting mechanism 209 adjusts the interval between the sample forks 212 and 213, and thereby it is possible to handle the container 6 in which the sample S is contained and which has a cylindrical shape with an arbitrary diameter.

Modification Example of Example 1

A modification example of Example 1 are described with reference to FIGS. 5A, 5B, 6A, and 6B.

In the examples described with reference to FIGS. 3A to 4C, the central axis and the rotation axis of the container 6 are coincident with C in a state in which the sample transport unit 3 or 31 holds the container 6, in which the sample S is contained. On the other hand, in the modification example, an example in which the central axis and the rotation central axis of the container 6 are not coincident with each other in a state in which the sample transport unit 32 corresponding to the sample transport unit 3 holds the sample S, that is, a case where irradiation is performed with the X-rays and an image of transmission X-rays transmitted through the sample S contained in the container 6 is imaged in a state in which the central axis of the container 6 is inclined with respect to a rotation central axis C thereof.

In a case where the container 6 is a bottle or a vial and a defect is present in the sample S on a side of the bottom of the container 6, it may be difficult to perform detection with high sensitivity due to absorption or the like of X-rays by unevenness of the bottom of the sample contained in the container 6 when the irradiation is performed with the X-rays immediately from a side of the container 6, in which the sample is contained as illustrated in FIG. 3B or 4C. A change in an inclination angle ϕ of the container 6 enables the bottom of the sample to be projected onto a TDI sensor 4c, and thus it is also possible to inspect the defect in the bottom of the sample with high sensitivity.

FIGS. 5A and 5B illustrate a state in which the sample transport unit 32 holds the container 6, in which the sample S is contained. According to the modification example, the container 6, in which the sample S is contained, is held on a linear transport rail 552 by a sample inclining mechanism 553, a sample rotating mechanism 554, and a sample holder 555, which all configure the sample transport unit 32. The sample inclining mechanism 553 has a configuration of a goniometer.

FIG. 5A illustrates a state in which the container 6 is held such that the central axis and the central axis C of the rotation of the container 6, in which the sample S is contained, are coincident with each other, and FIG. 5B illustrates a state in which the container is held such that the central axis of the container 6 is inclined with respect to the central axis C of the rotation thereof by the inclination angle ϕ. The container 6, in which the sample S is contained, is held by the sample transport unit 32 in a state in which the container is rotatable around the rotation central axis C.

FIG. 6A illustrates a configuration of the modification example in which the X-ray transmission image is detected by using four TDI sensors 4-1 to 4-4 while the sample transport unit 32 performs the transporting on the linear transport rail 552. In the modification example, two X-ray sources of an X-ray source 1-1 and an X-ray source 1-2 are used, and a shielding plate 610 is provided to prevent the X-rays emitted from the X-ray sources from interfering with each other on the samples.

In the configuration illustrated in FIG. 6A, while the container 6 reaches a region which is a detection target by a TDI sensor 4-2 after the container is imaged by a TDI sensor 4-1, the container 6, in which the sample S is contained, rotates by 90 degrees by the sample rotating mechanism 554, and the container 6, in which the sample S is contained, is set at a position of a sample transport unit 32-2 such that an azimuth angle is different from that at a position of a sample transport unit 32-1.

As illustrated in FIG. 6B, imaging is performed under two conditions of a condition A and a condition B, and thereby it is possible to detect a defect with high sensitivity regardless of a position in the container 6. For example, since a defect of the sample S on a side surface of a cylindrical inner wall of the container 6 (a position of the center of the sample when the sample is viewed from a focal point 2-1) under the condition A is present on a side surface of the inner wall of the container 6 under the condition B, it is possible to detect a defect that cannot be detected with high sensitivity under only the condition A.

In addition, while the sample transport unit 32 performs the transporting on the linear transport rail 552 and the container reaches a region which is a detection target by a TDI sensor 4-3 at a position of a sample transport unit 32-3 after the container is imaged by a TDI sensor 4-2 at a position of a sample transport unit 32-2, the sample rotating mechanism 554 adjusts the inclination angle ϕ of the container 6, in which the sample S is contained.

In the sample of a bottle or a vial, in a case where a defect is present on the bottom of the sample, it may be difficult to perform detection with high sensitivity due to absorption or the like of X-rays by unevenness of the bottom of the container 6 when the irradiation is performed with the X-rays immediately from a side of the container 6 as illustrated in FIG. 5A. The change in the inclination angle ϕ of the container 6 enables the bottom of the sample to be projected onto a TDI sensor 4-3, and thus it is also possible to inspect the defect in the bottom of the sample with high sensitivity.

Further, while the sample transport unit 32 performs the transporting on the linear transport rail 552 and the container reaches a region which is a detection target by a TDI sensor 4-4 at a position of a sample transport unit 32-4 after the container is imaged by a TDI sensor 4-3 at a position of a sample transport unit 32-3, the sample rotating mechanism 554 causes the container 6 to rotate by 90 degrees and an azimuth angle is set to be different from that when the imaging is performed by the TDI sensor 4-3. Imaging is performed under two conditions of a condition C and a condition D in a state of the inclination angle ϕ, and thereby it is possible to detect a defect with high sensitivity regardless of a position in the container 6. For example, a defect on the bottom of a cylindrical inner wall of the container 6 (a position of the center of the sample when the sample is viewed from a focal point 2-2) under the condition C is present on a side surface of the inner wall of the container 6 under the condition D. In this manner, it is possible to detect, under the condition C, a defect that cannot be detected with high sensitivity under only the condition D.

FIG. 7 illustrates a flowchart of an X-ray inspection method according to the example.

First, the controller 8 receives a signal related to the inspection conditions or the like received from the input unit 10 or the other component members in FIG. 1 (S701), and the controller 8 performs condition setting of the sample transport unit 3, the TDI camera 4, the X-ray tube 1, or the like (S702). Then, the sample is irradiated with the X-rays by the X-ray tube 1 under the condition set in S702 (S703). The X-rays with which the irradiation is performed in S703 are transmitted through the sample and the X-ray transmission image is detected by the TDI camera 4 (S704). The defect determining unit 7 processes the X-ray transmission image detected in S704 and detects a defect present in the sample (S705). Detection results of the defect in S705 are displayed on the display unit 9 (S706).

In a case where a plurality of images are acquired by using a plurality of TDI cameras as illustrated in FIG. 6, processes of S703 and S704 may be repeatedly performed the number of times (four times in a case in FIG. 7) corresponding to the number of the plurality of cameras, the obtained images may be integrated, and the defect detection may be performed in S705.

According to the example, it is possible to detect a relatively small defect even for a thick inspection target object with high sensitivity without degradation of spatial resolution.

Example 2

Hereinafter, a second example of the present invention will be described. The X-ray inspection device in the example has the same configuration as the X-ray inspection device 100 described in Example 1 with reference to FIG. 1, and thus the description thereof is omitted.

FIG. 8 is a view illustrating a principle of a sample transporting method in the example. In Example 1, the case where the rotation center of the container 6, in which the sample S is contained, is set at the center of the container 6 is described; however, in this example, a case where the rotation center of the container 6 is set at the position of the focal point 2 of the X-ray source 1 is described.

In FIG. 8, the X-rays emitted from the focal point 2 of the X-ray source 1 are radially propagated around the focal point 2 and are detected by the TDI camera 4. The container 6, in which the sample S is contained, is transported by the sample transport unit 3 so as to pass within a detection range of the TDI camera 4. While the container passes within the detection range of the TDI camera 4, the sample transport unit 3 causes the container 6, in which the sample S is contained, to move straightly at a certain speed v and to rotate at a certain angular velocity ω.

An object O1 and an object O2 are assumed to be present in the sample S contained in the container 6 on a side closer to and on another side away from the focal point 2, respectively. Distances from the focal point 2 to the object O1, the object O2, and a light receiving surface of the TDI sensor 4 are represented by L1, L2, and L, respectively. The objects O1 and O2 are projected on the light receiving surface with magnifications M1 and M2, respectively. M1=L/L1, and M2=L/L2.

If the rotation of the sample S is not performed (ω=0), movement distances of the objects O1 and O2 in the X direction from a time point t0 to a time point t0+Δt are both vΔt. Accordingly, movement distances of images of the objects O1 and O2 on the TDI sensor 4 are ΔX1=M1·vΔt and ΔX2=M2·vΔt, respectively, and the movement distances of images are different from each other due to a difference in magnification. When a period of time Δt is assumed to be equal to a period of time for the TDI computation of the TDI camera 4, and the line rate of the TDI camera 4 is assumed to be adjusted in accordance with the movement of the image of one of the objects O1 and O2, the position of the image of the other object is shifted by |ΔX1−ΔX2| during the integral computation of the TDI camera 4.

An error in the TDI computation results in a blur on the image, which has a size corresponding to the error. In other words, since the movement distance or the movement speed varies depending on a position of the sample S contained in the container 6 in the thickness direction, the line rate of the TDI camera 4 is set depending on a specific position in the thickness direction. In this manner, the spatial resolution of an image is degraded at other positions, and thus the inspection sensitivity is degraded.

In the example, as illustrated in FIG. 8, the container 6 is caused to rotate while the sample transport unit 3 causes the container 6 to straightly move from a state in (a) to a state in (b). A rotating direction is a direction in which the movement distance or the movement speed of the container 6 on a side close to the focal point 2 is shorter or lower than that on a side away from the focal point 2. Here, the movement distance or the movement speed indicates a movement distance component or a movement speed component of the X direction in FIG. 8, that is, the integral computation direction of the TDI sensor 4. According to such a transport method, since a difference |ΔX1−ΔX2| of the movement distance is reduced due to a difference in magnification, compared to a case where the rotation of the container 6 is not performed, the blur on the image is reduced due to the integral computation error of the TDI sensor 4, and thus it is possible to perform the inspection with high sensitivity.

An example of a method of rotating the container 6, in which the sample S is contained, is described as follows with reference to a geometrical position relationship between the focal point 2 and the container 6. The container 6 is caused to rotate such that the ray direction of the X-rays which are radially generated from the focal point 2 and a relative direction of the container 6 with respect to the ray direction are maintained during the integral computation of the TDI sensor 4.

Specifically, as illustrated in FIG. 8, the container 6 is caused to rotate such that a relative direction of the container 6 with respect to a ray 101 that is generated from the focal point 2 at a time point t in (a) is the same as a relative direction 101 of the container 6 with respect to a ray 102 at a time point t' in (b). Here, the rays 101 and 102 that pass through the center of the sample S contained in the container 6 are described as examples for simplification of the description; however, as long as the distance between the focal point 2 and the container 6 does not change, by the rotating method described above, the direction of the ray with respect to the sample S in which the ray passes through an arbitrary position in the sample S contained in the container 6 is substantially maintained during the period of time of the integral computation of the TDI sensor 4. In this manner, the same movement distance is substantially obtained during the period of time Δt of a transmission image corresponding to an arbitrary position in the sample S.

FIG. 9 illustrates a sample transporting method of the second example of the present invention. The X-ray inspection device in the example has the same configuration as the X-ray inspection device 100 described in Example 1 with reference to FIG. 1, and thus the description thereof is omitted. According to the sample transport unit illustrated in FIG. 9, the sample transport unit 3 is configured to transport the container, in which the sample S is contained, by following an arc-shaped track around the focal point 2. FIG. 9 illustrates an example in which the sample is mounted and transported on an arc-shaped conveyor 301 as the sample transport unit 3.

In the example, as can be viewed in FIG. 9, the condition of the sample transporting method described with reference to FIG. 8 in which the container 6 is caused to rotate such that the ray direction of the X-rays which are radially generated from the focal point 2 and a relative direction of the sample S contained in the container 6 with respect to the ray direction are maintained during the period of time of the integral computation of the TDI sensor 4 is satisfied.

In the example, the transport speed of the conveyor 301 is constant. In this case, since the conveyor 301 follows the arc track, a speed component in the X direction is not perfectly constant; however, that an error occurring in this case is not a practical problem is described as follows with reference to FIG. 9. When attention is paid to an object position O1 in the sample S contained in the container 6, O1 passes through an arc track 302 away from the conveyor 301 by a distance h. When v represents a transport speed (linear speed) of the conveyor 301 having the arc track, and Ω (=v/L0) represents the angular velocity corresponding to the transport speed, a position x' of an image at the time point t of an image of O1 on the TDI sensor 4 is L tan (Ωt) and does not depend on a position h in the sample in the thickness direction.

On the other hand, a position x of an ideal image, on which the blur due to the TDI computation is zero, is LΩt. A difference Δx between both positions is obtained from Δx=x−x'=L[tan(Ωt)−Ωt]=L[tan(x/L)−x/L]. When the width of the TDI computation of the TDI sensor 4 is 6.14 mm (=48 μm×128 stages) when x is the maximum, and L is 300 mm, x/L ≪1. Therefore, Δx approximates to $(x/L2)^2 \cdot x/3$, and the value of Δx is obtained to be 0.13 μm. Since the value is small to be negligible with respect to the pixel size of 48 μm of the TDI sensor 4, the blur due to the TDI computation is reduced to be negligible.

FIGS. 10A and 10B illustrate an example of the sample transport unit 3 in the example for performing the sample transporting method illustrated in FIG. 9. The sample transport unit 3 in the example includes a sample holder 322, a sample-holder position adjusting mechanism 324, a sample arm 321, and an arm rotating mechanism 323. The sample holder 322 holds the container 6, in which the sample S is contained, and is fixed to the sample arm 321. The sample-holder position adjusting mechanism 324 adjusts the position of the sample holder 322 with respect to the sample arm 321. In order to reduce a penumbra blur on an image generated depending on the size of the focal point 2, it is effective to approach the container 6 to the TDI sensor 4 in a range in which the container does not collide with the TDI sensor 4. The arm rotating mechanism 323 causes the sample arm 321 to rotate around the rotation axis C that passes through the focal point 2 at a constant rotation speed within an XZ plane in FIG. 10A. While the sample S contained in the container 6 is imaged by the TDI sensor 4 due to the rotation of the sample arm 321, a relative position and direction (posture) of the container 6 with respect to the sample arm 321 are constant.

FIG. 11 illustrates an example of another configuration of the sample transport unit 3 for performing the sample transporting method illustrated in FIG. 9. In the configuration illustrated in FIG. 11, the sample transport unit 3 includes an arc transport rail 341 and a sample holder 342. As illustrated in a plan view in (a), the arc transport rail 341 includes a rail or a guide and a drive mechanism that transport the sample holder 342 along an arc-shaped track around the focal point 2 at a constant linear speed. As illustrated in a front view in (b), the sample holder 342 holds the container 6, in which the sample S is contained. A sample holder mark 343 fixed on the sample holder 342 is illustrated to show a direction of the sample holder 342. The sample holder 342 is transported with an orientation thereof changing along the arc transport rail 341, and thereby the transporting is performed while the direction of the sample S contained in the container 6 is maintained with respect to the X-rays emitted from the focal point 2.

FIGS. 12A and 12B illustrate an example of still another configuration of the sample transport unit 3 for performing the sample transporting method illustrated in FIG. 9. In the configuration illustrated in FIGS. 12A and 12B, the sample transport unit 3 includes a turntable 361 that rotates around the rotation axis passing through the focal point 2 in parallel with the Y-axis. As illustrated in FIG. 12A, the turntable 361 mounts the container 6, in which the sample S is contained, and rotates at a constant speed, and thereby the sample transporting method illustrated in FIG. 9 is performed. As illustrated in FIG. 12B, a sample holder 362 that fixes the sample S, as necessary, is disposed on the turntable 361 such that the position of the container 6, in which the sample S is contained, on the turntable 361 is not shifted with acceleration due to the rotation.

FIGS. 13A and 13B illustrate an example of still another configuration of the sample transport unit 3 for performing the sample transporting method illustrated in FIG. 9. The sample transport unit 3 in FIGS. 13A and 13B is configured to transport the container 6, in which the sample S is contained, on a belt conveyor. As illustrated in a plan view in FIG. 13A, the sample transport unit 3 includes a belt 381, guide rollers 382 and 383, circular guide rollers 384 and 385, and a drive mechanism 386.

In addition, as illustrated in a front view of FIG. 13B, the guide rollers 382 and 383 and the circular guide roller 384 press the belt 381, and thereby the belt 381 has an arc-shaped cross section on a detection region on the TDI sensor 4. The circular guide rollers 384 and 385 have a circular shape around the focal point 2. Therefore, as illustrated in FIG. 13A, the circular guide rollers press both ends of the belt 381 so as not to come into contact with the container 6 in which the sample S is contained and which passes on the belt 381. The guide rollers freely rotate around fixed rotary shafts along with the transporting of the belt 381 by the drive mechanism 386. According to the configuration described above, the container 6, in which the sample S is contained, is transported along an arc-shaped track around the focal point 2 when the container passes the detection region on the TDI sensor 4.

FIGS. 14A and 14B illustrate a modification example of the configuration of the sample transport unit 3 illustrated in FIGS. 13A and 13B. The example of the configuration of the circular guide rollers 384 and 385 illustrated in FIGS. 13A and 13B is replaced with a configuration including arcuately-arranged guide rollers 391 and 392 in FIGS. 14A and 14B.

As illustrated in FIG. 14B, the arcuately-arranged guide rollers 391 and 392 include a plurality of guide rollers having central axes parallel to each other which are arranged such that an envelope curve on a side of the belt 381 is an arc around the focal point 2. The arcuately-arranged guide rollers are configured to include the guide rollers having small diameter, thereby performing approximately the same function as the circular guide rollers 384 and 385. The arcuately-arranged guide rollers have an advantage in that the rollers occupy a small space, compared to the circular guide rollers 384 and 385.

A relationship between a range of a region for performing the transporting method of the example, a size of the container 6, in which the sample S is contained, and the X-ray optical system configured to include the X-ray tube 1 and the TDI sensor 4 is described with reference to FIG. 15. $W_S$ represents a width of a TDI computation region of the TDI sensor 4, ω represents a width of a footprint of the container 6, in which the sample S is contained, and H represents a height. R2 and R3 represent tracks of the X-rays that are emitted from the focal point 2 and reach both ends of the TDI computation region of the TDI sensor 4.

On the cross section illustrated in FIG. 15, a hatched region between R2 and R3 is the region as the detection target by the TDI sensor 4. While a part of the sample S contained in the container 6 passes through the region, the transporting method in which the container 6, in which the sample S is contained, rotates as illustrated in FIG. 2 in Example 1 or illustrated in FIG. 8 in the example, or the transporting method in which the sample S passes through the arc-shaped track illustrated in FIG. 9 is performed.

As illustrated in FIGS. 13A, 13B, 14A, and 14B, in a case where the sample is mounted and transported on the arc-shaped belt, the sample S contained in the container 6 needs to be transported through the arc-shaped track from a point of time when a right end of the sample S contained in the container 6 reaches R2 (a point of time when the sample is placed at a position of S1) to a point of time when a left end of the sample S ends passing through R3 (a point of time when the sample is placed at a position of S2) when the container 6, in which the sample S is contained, is transported from left to right in FIG. 15.

A range of the belt 381 from the left end of the footprint of the sample, which is obtained when the sample S is placed at the position of S1, to the right end of the footprint of the sample, which is obtained when the sample S is placed at the position of S2, is a range 401. The belt 381, on which the container 6 is mounted, needs to form the arc-shaped track around the focal point 2 in at least the range 401. The width of the range 401 changes depending on a height H of the sample S or the shape of the sample; however, the width is simply calculated from $W_S+2W$.

FIG. 16A illustrates an example of the transport unit 3 that performs imaging in a plurality of sample directions by the sample transporting method illustrated in FIG. 9. Here, an example of a case where the sample is a cylindrical bottle or a medical vial. The sample transport unit 3 includes an arc transport rail 502, sample goniometer mechanisms 503a to 503d, sample rotating mechanisms 504a to 504d, and sample holders 505a to 505d. The arc transport rail 502 includes a rail or a guide and a drive mechanism that transport samples Sa to Sd along an arc-shaped track around the focal point 2 at a constant linear speed.

The sample holders 505a to 505d hold the samples Sa to Sd, respectively. Sample holder marks 511a to 511d on the sample holders 505a to 505d are illustrated to show an azimuth angle θ of the sample. The sample holders 505a to 505d are transported with orientations thereof changing along the arc transport rail 502, and thereby the transporting is performed while the direction of the sample S is maintained with respect to the X-rays emitted from the focal point 2. The samples Sa to Sd are transported in different directions with respect to TDI sensors 4a to 4d, respectively.

An example of conditions of the directions of the samples Sa to Sd with respect to the TDI sensors 4a to 4d is illustrated in conditions a to d in a table in FIG. 16B. Samples loaded from a sample inlet 501 pass sequentially through positions of the samples Sa to Sd and are transported from a sample outlet 509, and thereby the samples are imaged under four conditions of conditions a to d. The sample transporting unit includes a plurality of sample transport mechanisms and TDI sensors, and inspection is performed under a plurality of imaging conditions (conditions a to d). In this manner, it is possible to perform the inspection at a high speed, compared to a case where the inspection is performed under a plurality of imaging conditions with a single TDI sensor.

Modification Example of Example 2

FIG. 17 illustrates a sample transport mechanism of the sample transport unit 3, which holds the sample Sa, illustrated in FIG. 16A. The container 6, in which the sample S is contained, is held on an arc transport rail 502 by a sample inclining mechanism 503a, a sample rotating mechanism. 504a, and a sample holder 505a. Further, while the container 6 reaches a region Sb which is the detection target by the TDI sensor 4b after the container transported on the arc transport rail 502 and is imaged by the TDI sensor 4a at the position of Sa, the sample rotating mechanism 504a causes the container 6 to rotate and a sample azimuth angle at the position of Sb is set to be different from an azimuth angle obtained at the position of Sa.

Imaging is performed under two conditions of the condition a and the condition b, and thereby it is possible to perform the detection with high sensitivity regardless of the position of the defect in the sample. For example, since a defect on a side surface of an inner wall of a cylindrical sample (position of both ends of the sample when the sample is viewed from the focal point 2) under the condition a is present on a front surface of the sample inner wall (a position of the center of the sample when the sample is viewed from the focal point 2) under the condition b, it is possible to detect a defect that cannot be detected with high sensitivity under only the condition a.

FIG. 18 illustrates a sample transport mechanism of the sample transport unit 3, which holds the container 6 at a position of Sc, illustrated in FIG. 16. The configuration is the same as that illustrated in FIG. 17. A sample inclining mechanism 503c adjusts an inclination angle θ of a container 6c, in which the sample Sc is contained. In a case where the container 6c is a bottle or a vial and a defect is present in a portion of the sample Sc contained in the container 6c, which is placed on the bottom of the container 6c or is close to the bottom thereof, it may be difficult to perform detection with high sensitivity due to absorption or the like of X-rays by unevenness of the bottom of the container 6 when the irradiation is performed with the X-rays immediately from a side of the container 6c as illustrated in FIG. 17. As illustrated in FIG. 18, a change in the inclination angle θ of the container 6c enables the bottom of the container 6c to be projected onto the TDI sensor 4c, and thus it is also possible to inspect the defect on the bottom of the container 6c with high sensitivity.

Processing flow in the X-ray inspection method according to the example is the same as the processing flow described in Example 1 with reference to FIG. 7, and thus the description thereof is omitted.

According to the example, it is possible to detect a relatively small defect even for a thick inspection target object with high sensitivity without degradation of spatial resolution.

The present invention is not limited to the examples described above, and the present invention may include various modification examples. For example, the examples described above are described in detail for easy understanding of the present invention, and the present invention is not necessarily limited to the example including the described entire configuration. In addition, it is possible to replace some configurations in a certain example with configurations in another example, and it is also possible to add a configuration in one example to a configuration in another example. In addition, it is possible to perform addition, removal, and replacement of another configuration to, from, and with some configurations in the examples.

In addition, control lines or information lines are illustrated when they are considered to be necessary for the description, and all of the control lines and information lines are not completely illustrated for the products. Actually, almost all of the configurations may be considered to be connected to each other.

REFERENCE SIGNS LIST

1: X-ray tube
2: X-ray source
3, 31, 32: sample transport unit
4: TDI camera
5: X-ray shielding unit
6: container
7: defect determining unit
8: controller
9: display unit
10: input unit
100: X-ray inspection device

The invention claimed is:
1. An X-ray inspection device comprising:
an X-ray source that generates X-rays;

a sample transporter comprising a linear motion conveyor and a rotating mechanism that performs transporting of a sample;

a detecting unit that has a time delay integration type detector which detects X-rays generated by the X-ray source and transmitted through the sample transported by the sample transporter; and an image analyzer configured to process a signal obtained by detecting the X-rays transmitted through the sample by the time delay integration type detector of the detecting unit and to determiner a defect in the sample, wherein the sample transporter is configured to transport the sample while causing the sample to rotate in synchronization with the transporting when the sample passes in front of the time delay integration type detector of the detecting unit, and wherein the sample transporter is further configured to transport the sample at a constant linear movement velocity, v, and a constant angular velocity, ω, such that the linear movement velocity v is a constant regardless of a position, h, of an object distance from a central axis of the sample in a thickness direction.

2. The X-ray inspection device according to claim 1, wherein the sample transporter performs transporting of the sample while causing the sample to rotate around the central axis of the sample in synchronization with the transporting.

3. The X-ray inspection device according to claim 1, wherein the sample transporter performs transporting of the sample while causing the sample to rotate around the central axis of the sample of an inclined state in synchronization with the transporting in a state in which the sample is inclined.

4. The X-ray inspection device according to claim 1, wherein the detecting unit has a plurality of the time delay integration type detectors, and the sample transporter performs transporting of the sample while causing the sample to rotate in synchronization with the transporting by changing an inclination angle or an azimuth angle of the sample for each of the time delay integration type detectors, when the sample transporter causes the sample to pass in front of the plurality of time delay integration type detectors of the detecting unit.

5. The X-ray inspection device according to claim 1, wherein the sample transporter contains the sample in a container, which transmits X-rays, and performs transporting of the container.

6. The X-ray inspection device according to claim 5, wherein the container is a medical vial, and the time delay integration type detector of the detecting unit detects X-rays transmitted through the sample after the sample contained in the container is irradiated from a side surface of the container with X-rays generated by the X-ray source.

7. An X-ray inspection method comprising:
irradiating a sample to which transporting is performed by a sample transporter with X-rays generated from an X-ray source;

transporting the sample at a constant linear movement velocity, v, and a constant angular velocity, ω, such that the linear movement velocity v is a constant regardless of a position, h, of an object distance from a central axis of the sample in a thickness direction;

detecting X-rays transmitted through the sample irradiated with the X-rays, by a time delay integration type detector; and processing a signal obtained by detecting the X-rays transmitted through the sample by the time delay integration type detector and determining a defect in the sample, wherein the sample is irradiated with the X-rays while the sample is caused to rotate in synchronization with the transporting when the sample passes in front of the time delay integration type detector of the detecting unit.

8. The X-ray inspection method according to claim 7, wherein transporting of the sample is performed while the sample is caused to rotate in synchronization with the transporting with the central axis of the sample as the central axis of the rotation when the sample passes in front of the time delay integration type detector of the detecting unit.

9. The X-ray inspection method according to claim 7, wherein transporting of the sample is performed while the sample is caused to rotate in synchronization with the transporting with the central axis of the sample of an inclined state as the central axis of the rotation in a state in which the sample is inclined when the sample passes in front of the time delay integration type detector of the detecting unit.

10. The X-ray inspection method according to claim 7, wherein transporting of the sample is performed while the sample is caused to rotate in synchronization with the transporting by changing an inclination angle or an azimuth angle of the sample for each of time delay integration type detectors when the sample passes in front of a plurality of the time delay integration type detectors.

11. The X-ray inspection method according to claim 7, wherein the sample transporter contains the sample in a container, which transmits X-rays, and performs the transporting of the sample.

12. The X-ray inspection method according to claim 11, wherein the container that transmits the X-rays is a medical vial, and the detector detects X-rays transmitted through the sample by causing the time delay integration type detector to detect the X-rays transmitted through the sample after the sample contained in the container is irradiated from a side surface of the container with X-rays generated by the X-ray source.

13. An X-ray inspection method comprising:
irradiating a sample to which transporting is performed by a sample transporter with X-rays generated from an X-ray source;

detecting X-rays transmitted through the sample irradiated with the X-rays, by a time delay integration type detector; and processing a signal obtained by detecting the X-rays transmitted through the sample by the time delay integration type detector and determining a defect in the sample, wherein the sample is irradiated with the X-rays while the sample is caused to rotate in synchronization with the transporting when the sample passes in front of the time delay integration type detector of the detecting unit, and wherein transporting of the sample is performed while the sample is caused to rotate around a focal position of X-rays generated from the X-ray source in synchronization with the transporting when the sample passes in front of the time delay integration type detector of the detecting unit.

14. The X-ray inspection method according to claim 13, wherein said transporting of the sample is performed while the sample is caused to rotate around a focal position of X-rays generated from the X-ray source in synchronization with the transporting in a state in which the sample is inclined.

15. An X-ray inspection device comprising:
an X-ray source that generates X-rays;
a sample transporter comprising a linear motion conveyor and a rotating mechanism that performs transporting of a sample;
a detecting unit that has a time delay integration type detector which detects X-rays generated by the X-ray source and transmitted through the sample transported by the sample transporter; and
an image analyzer configured to process a signal obtained by detecting the X-rays transmitted through the sample by the time delay integration type detect or of the detecting unit and to determine a defect in the sample,
wherein the sample transporter is configured to transport the sample while causing the sample to rotate in synchronization with the transporting when the sample passes in front of the time delay integration type detector of the detecting unit, and
wherein the sample transporter performs transporting of the sample while causing the sample to rotate around a focal position of X-rays generated from the X-ray source in synchronization with the transporting.

16. The X-ray inspection device according to claim 15, wherein the sample transporter performs said transporting of the sample while causing the sample to rotate around a focal position of X-rays generated from the X-ray source in synchronization with the transporting in a state in which the sample is inclined.

* * * * *

UNITED STATES PATENT AND TRADEMARK OFFICE
CERTIFICATE OF CORRECTION

PATENT NO. : 10,823,686 B2
APPLICATION NO. : 15/744223
DATED : November 3, 2020
INVENTOR(S) : Yuta Urano et al.

Page 1 of 1

It is certified that error appears in the above-identified patent and that said Letters Patent is hereby corrected as shown below:

In the Claims

At Column 17, Claim number 1, Line 11, "determiner" should read --determine--

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*